US011595195B2

United States Patent
Schneider et al.

(10) Patent No.: US 11,595,195 B2
(45) Date of Patent: Feb. 28, 2023

(54) MASKED DECODING OF POLYNOMIALS

(71) Applicant: NXP B.V., Eindhoven (NL)

(72) Inventors: Tobias Schneider, Graz (AT); Joppe Willem Bos, Wijgmaal (BE); Björn Fay, Brande-Hörnerkirchen (DE); Marc Gourjon, Hamburg (DE); Joost Roland Renes, Eindhoven (NL); Christine van Vredendaal, Veldhoven (NL)

(73) Assignee: NXP B.V., Eindhoven (NL)

(*) Notice: Subject to any disclaimer, the term of this patent is extended or adjusted under 35 U.S.C. 154(b) by 42 days.

(21) Appl. No.: 17/226,770

(22) Filed: Apr. 9, 2021

(65) Prior Publication Data

US 2022/0337398 A1    Oct. 20, 2022

(51) Int. Cl.

| H04L 29/06 | (2006.01) |
|---|---|
| H04L 9/08 | (2006.01) |
| H04L 9/30 | (2006.01) |
| G06F 7/76 | (2006.01) |
| G06F 7/02 | (2006.01) |

(52) U.S. Cl.
CPC ............... *H04L 9/085* (2013.01); *G06F 7/02* (2013.01); *G06F 7/764* (2013.01); *H04L 9/3006* (2013.01); *H04L 9/3093* (2013.01); *H04L 2209/046* (2013.01); *H04L 2209/34* (2013.01)

(58) Field of Classification Search
CPC ..... H04L 9/085; H04L 9/3006; H04L 9/3093; H04L 2209/046; H04L 2209/34; G06F 7/02; G06F 7/764
See application file for complete search history.

(56) References Cited

U.S. PATENT DOCUMENTS

| 9,977,899 | B2* | 5/2018 | Roussellet | G06F 21/64 |
|---|---|---|---|---|
| 9,992,013 | B2* | 6/2018 | Georgieva | H04L 9/3026 |
| 10,430,565 | B2* | 10/2019 | Moritz | G06F 9/30003 |
| 2017/0000390 | A1* | 1/2017 | Biederman | A61B 5/14532 |

OTHER PUBLICATIONS

Roy et al., "Hardware Assisted Fully Homomorphic Function Evaluation and Encrypted Search", IEEE Transactions on Computers, vol. 66, No. 9, September (Year: 2017).*

(Continued)

*Primary Examiner* — Morshed Mehedi

(57) ABSTRACT

Various embodiments relate to a method for masked decoding of a polynomial a using an arithmetic sharing a to perform a cryptographic operation in a data processing system using a modulus q, the method for use in a processor of the data processing system, including: subtracting an offset δ from each coefficient of the polynomial a; applying an arithmetic to Boolean (A2B) function on the arithmetic shares of each coefficient $a_i$ of the polynomial a to produce Boolean shares $â_i$ that encode the same secret value $a_i$; and performing in parallel for all coefficients a shared binary search to determine which of coefficients $a_i$ are greater than a threshold t to produce a Boolean sharing value $\hat{b}$ of the bitstring b where each bit of b decodes a coefficient of the polynomial a.

8 Claims, 1 Drawing Sheet

(56) References Cited

OTHER PUBLICATIONS

Ravi, Prasanna Ravi et al., "Generic Side-channel attacks on CCA-secure lattice-based PKE and KEMs." IACR Transactions on Cryptographic Hardware and Embedded Systems ISSN 2569-2925, vol. 2020, No. 3, pp. 307-335.
Bruneau, Nicolas et al., "Multi-variate High-Order Attacks of ShuffledTables Recomputation." International Association for Cryptologic Research 2015: CHES 2015, LNCS 9293, pp. 475-494, 2015.
Ishai, Yuval et al., "Private Circuits: Securing Hardware against Probing Attacks." Advances in Cryptology—CRYPTO 2003;19 pgs.
Rivain, Matthieu et al., "Provably Secure Higher-Order Masking of AES." Full version of the paper published in the proceedings of CHES 2010; 19 pgs.
Barthe, Gilles et al., "Masking the GLP Lattice-Based Signature Scheme at Any Order." Advances in Cryptology—EUROCRYPT 2018; 52 pgs.
Coron, Jean-Sebastien, "Higher Order Masking of Look-up Tables." University of Luxembourg; EUROCRYPT 2014; 18 pgs.
Oder, Tobias et al., "Practical CCA2-Secure and Masked Ring-LWE Implementation." IACR Transactions on Cryptographic Hardware and Embedded Systems ISSN 2569-2925, vol. 2018, No. 1, pp. 142-174.
Reparaz, Oscar et al., "A Masked Ring-LWE Implementation." ICryptographic Hardware and Embedded Systems—CHES 2015; 21 pgs.
Beirendonck, Michiel Van, "A Side-channel Resistant Implementation of SABER." ePrint Arch. 2020; 28 pgs.
Lyubashevsky, Vadim et al., "On Ideal Lattices and Learning with Errors Over Rings." Jun. 25, 2013; 34 pgs.
Regev, Oded, "On Lattices, Learning with Errors,Random Linear Codes, and Cryptography," May 2, 2009; 37 pgs.
Computer Security Resource Center; Post Quantum-Cryptography PQC; Created Jan. 3, 2017, updated Jan. 11, 2021; 2 pgs.
Coron, Jean-Sebastien et al., Secure Conversion Between Boolean and Arithmetic Masking of Any Order Cryptographic Hardware and Embedded Systems—CHES 2014; 18 pgs.
U.S. Appl. No. 17/154,116 to Schneider et al., filed Jan. 21, 2021.

* cited by examiner

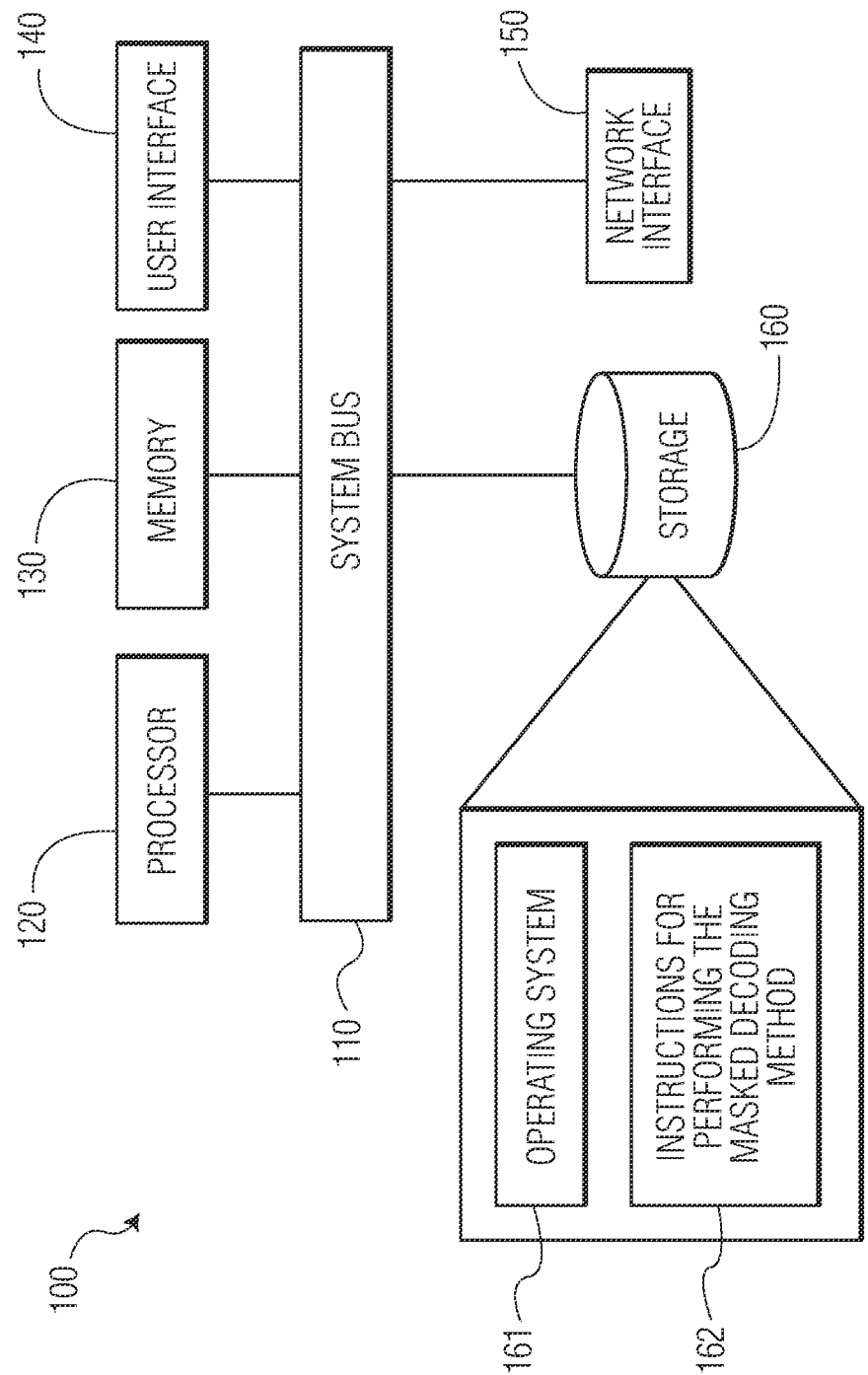

MASKED DECODING OF POLYNOMIALS

TECHNICAL FIELD

Various exemplary embodiments disclosed herein relate generally to masked decoding of polynomials.

BACKGROUND

Recent significant advances in quantum computing have accelerated the research into post-quantum cryptography schemes: cryptographic algorithms which run on classical computers but are believed to be still secure even when faced with an adversary with access to a quantum computer. This demand is driven by interest from standardization bodies, such as the call for proposals for new public-key cryptography standards by the National Institute of Standards and Technology (NIST). The selection procedure for this new cryptographic standard has started and has further accelerated the research of post-quantum cryptography schemes.

There are various families of problems to instantiate these post-quantum cryptographic approaches. Constructions based on the hardness of lattice problems are considered to be promising candidates to become the next standard. A subset of approaches considered within this family are instantiations of the Learning With Errors (LWE) framework: the Ring-Learning With Errors problem. Another subset of approaches are based on recovering a quotient of polynomials in a ring. This means that the operations in these scheme involve arithmetic with polynomials with integer coefficients. Examples of the former include KYBER and NewHope, the latter NTRU-HRRS-KEM and Streamlined NTRU Prime.

When lattice based cryptographic functions are implemented, the main computationally expensive operations are the arithmetic with polynomials. More precisely, computations are done in a ring $R_q=(\mathbb{Z}/q\mathbb{Z})[X]/(F)$: the ring where polynomial coefficients are in $\mathbb{Z}/q\mathbb{Z}$ and the polynomial arithmetic is performed modulo F.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for masked decoding of a polynomial a using an arithmetic sharing a to perform a cryptographic operation in a data processing system using a modulus q, the method for use in a processor of the data processing system, including: subtracting an offset $\delta$ from each coefficient of the polynomial a; applying an arithmetic to Boolean (A2B) function on the arithmetic shares $a_i$ of each coefficient $a_i$ to produce Boolean shares $\hat{a}_i$ that encode the same secret value $a_i$; and performing in parallel for all coefficients a shared binary search to determine which of coefficients $a_i$ are greater than a threshold t to produce a Boolean sharing value $\hat{b}$ of the bitstring b where each bit of b decodes a coefficient of the polynomial a.

Various embodiments are described, further comprising bitslicing $\hat{a}$ to produce bitsliced values $\hat{x}$ wherein the binary search is based upon the bitsliced values $\hat{x}$.

Various embodiments are described, further comprising initiating the Boolean sharing value $\hat{b}$ to $(0, \ldots, 0)$ wherein performing in parallel for all coefficients a binary search further includes: updating the Boolean sharing $\hat{b}$ by iterating through each bit value associated with the modulus q starting with the most significant bit to determine when coefficients $a_i$ are greater than a threshold t.

Further various embodiments relate to a method for masked decoding of a polynomial a using an arithmetic sharing a to perform a cryptographic operation in a data processing system using a modulus q, the method for use in a processor of the data processing system, including: calculating $a_i^{(0)}=a_i^{(0)}-\delta$ mod q for each coefficient i of the polynomial a having m coefficients; calculating $\hat{a}_i=A2B(a_i)$ where A2B is an arithmetic to Boolean (A2B) function on the arithmetic shares of the coefficient $a_i$ of the polynomial a to produce Boolean shares $\hat{a}_i$ that encode the same secret value $a_i$; calculating $\hat{x}=\text{Bitslice}(\hat{a})$ where $\hat{x}$ are bitsliced values; calculating $\hat{y}=\text{Refresh}(2^m-1, 0, \ldots, 0)$ where the Refresh function refreshes a given Boolean sharing of a variable; calculating $\hat{b}=(0, \ldots, 0)$ to initialize the Boolean sharing $\hat{b}$ of the bitstring b; initializing a first tracking variable d to 0; perform the following steps to perform a binary search for each value of i from 1 to k where k is the number of bits in the modulo q: calculating $e=d+2^{k-i}$, where e is a second tracking variable; when e≥t calculate the following: $\hat{b}=\hat{b}\oplus\text{SecAND}(\hat{y},\hat{x}_{k-i})$ where the function SecAND computes the bit-wise AND of two given Boolean-shared inputs in a masked fashion and the function $\oplus$ computes the bit-wise XOR of two given Boolean-shared inputs; and $\hat{x}_{k-i}^{(0)}=\neg\hat{x}_{k-i}^{(0)}$, where the function $\neg$ computes the bit-wise negation of the input bitstring; when e≤t calculating d=e; when d=t returning the value $\hat{b}$ and ending the binary search; and calculating $\hat{y}=\text{SecAND}(\hat{y},\hat{x}_{k-i})$, where the function SecAND computes the bit-wise AND of two given Boolean-shared inputs in a masked fashion.

Further various embodiments relate to a data processing system comprising instructions embodied in a non-transitory computer readable medium, the instructions for masked decoding of a polynomial a using an arithmetic sharing a to perform a cryptographic operation in a processor, the instructions, including: instructions for subtracting an offset $\delta$ from each coefficient of the polynomial a; instructions for applying an arithmetic to Boolean (A2B) function on the arithmetic shares of the coefficient $a_i$ of the polynomial a to produce Boolean shares $\hat{a}_i$ that encode the same secret value $a_i$; and instructions for performing in parallel for all coefficients a shared binary search to determine which of the coefficients $a_i$ are greater than a threshold t to produce a Boolean sharing value $\hat{b}$ of the bitstring b where each bit of b decodes a coefficient of the polynomial a.

Various embodiments are described, further comprising instructions for bitslicing $\hat{a}$ to produce bitsliced values $\hat{x}$ wherein the binary search is based upon the bitsliced values $\hat{x}$.

Various embodiments are described, further comprising instructions for initiating the Boolean sharing value $\hat{b}$ to $(0, \ldots, 0)$ wherein performing in parallel for all shares a binary search further includes: instructions for updating the Boolean sharing $\hat{b}$ by iterating through each bit value associated with the modulus q starting with the most significant bit to determine when coefficients $a_i$ are greater than a threshold t.

Further various embodiments relate to a data processing system comprising instructions embodied in a non-transitory computer readable medium, the instructions for masked decoding of a polynomial a using an arithmetic sharing a to perform a cryptographic operation in a processor, the instructions, including: instructions for calculating $a_i^{(0)} = a_i^{(0)} - \delta \mod q$ for each coefficient i of the polynomial a having m coefficients; instructions for calculating $\hat{a}_i = A2B(a_i)$ where A2B is an arithmetic to Boolean (A2B) function on the arithmetic shares of the coefficient $a_i$ of the polynomial a to produce Boolean shares $\hat{a}_i$ that encode the same secret value $a_i$; instructions for calculating $\hat{x} = \text{Bitslice}(\hat{a})$ where $\hat{x}$ are bitsliced values; instructions for calculating $\hat{y} = \text{Refresh}(2^m - 1, 0, \ldots, 0)$ where the Refresh function refreshes a given Boolean sharing of a variable; instructions for calculating $\hat{b} = (0, \ldots, 0)$ to initialize the Boolean sharing $\hat{b}$ of the bitstring b; instructions for initializing a first tracking variable d to 0; instructions for performing the following steps to perform a binary search for each value of i from 1 to k where k is the number of bits in the modulo q: instructions for calculating $e = d + 2^{k-i}$, where e is a second tracking variable; instructions for when e≤t calculating the following: $\hat{b} = \hat{b} \oplus \text{SecAND}(\hat{y}, \hat{x}_{k-i})$ where the function SecAND computes the bit-wise AND of two given Boolean-shared inputs in a masked fashion and the function $\oplus$ computes the bit-wise XOR of two given Boolean-shared inputs; and $\hat{x}_{k-i}^{(0)} = \neg \hat{x}_{k-i}^{(0)}$, where the function $\neg$ computes the bit-wise negation of the input bitstring; instructions for when e≤t calculating d=e; instructions for when d=t returning the value $\hat{b}$ and ending the binary search; and instructions for calculating $\hat{y} = \text{SecAND}(\hat{y}, \hat{x}_{k-i})$, where the function SecAND computes the bit-wise AND of two given Boolean-shared inputs in a masked fashion.

BRIEF DESCRIPTION OF THE DRAWINGS

In order to better understand various exemplary embodiments, reference is made to the accompanying drawings, wherein:

FIG. 1 illustrates an exemplary hardware diagram for implementing the masked decoding method.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A common element of multiple post-quantum cryptographic scheme proposals is the decoding of polynomials to a bitstring. Often this is achieved by decoding each coefficient of the polynomial to a bit given some criteria, e.g., a threshold. One family of attacks, so-called side-channel analysis, exploits data dependencies in physical measurements of the target device (e.g., power consumption) and can be thwarted with the help of masking the processed data. A popular approach is to mask this decoding step. However, previous techniques introduce a significant performance overhead or can only be applied to specific moduli (i.e., the modulus is limited to a power-of-two).

The decapsulation operation of a Key Encapsulation Mechanism (KEM) extracts an encapsulated key from a given ciphertext using a secret key. If this secret key were to be leaked, it would invalidate the security properties provided by the KEM. It has been shown that unprotected implementations of post-quantum schemes are vulnerable to implementation attacks, e.g., side-channel analysis. In particular, it was demonstrated that the secret key can be extracted from physical measurements of key-dependent parts in the decapsulation operation. For several post-quantum KEMs, the key-dependent operations include a decoding of polynomials to a bitstring. Commonly, the coefficients of the polynomial are in $\mathbb{Z}_q$ (integers modulo q) and are mapped to one bit depending on their value. For this operation, the space of $\mathbb{Z}_q$ is split into two intervals $\mathcal{I}_0$ and $\mathcal{I}_1$, which are continuous, disjunct and their union covers the complete space of $\mathbb{Z}_q$. Coefficients which are in $\mathcal{I}_0$ may be mapped to 0. Coefficients which are in $\mathcal{I}_1$ may be mapped to 1. Note that usually the intervals are of the same size. However, this is not a requirement for the embodiments described herein which may process uneven intervals. While this decoding operation is trivial in the unmasked case, a secure implementation of these KEMs requires the integration of dedicated countermeasures for this step.

Masking is a common countermeasure to thwart side-channel analysis and has been utilized for various applications. Besides security, efficiency is also an important aspect when designing a masked algorithm. Important metrics for software implementations of masking are the number of operations and the number of fresh random elements required for the masking scheme.

The first dedicated masking scheme for the decoding of polynomials was presented in Oscar Reparaz, Sujoy Sinha Roy, Frederik Vercauteren, and Ingrid Verbauwhede, *A masked ring-lwe implementation*, Cryptographic Hardware and Embedded Systems—CHES 2015—17th International Workshop, Saint-Malo, France, Sep. 13-16, 2015, Proceedings (Tim Güneysu and Helena Handschuh, eds.), Lecture Notes in Computer Science, vol. 9293, Springer, 2015, pp. 683-702. It uses a probabilistic table-based approach to decode the coefficients of a masked polynomial to unmasked bits. The main drawbacks are that the solution is limited to first order security, produces unmasked output bits, introduces a high performance overhead, and due to its probabilistic nature increases the failure rate of the post-quantum scheme.

The next solution of masked decoding was present in Tobias Oder, Tobias Schneider, Thomas Pöppelmann, and Tim Güneysu, *Practical cca2-secure and masked ring-lwe implementation*, IACR Trans. Cryptogr. Hardw. Embed. Syst. 2018 (2018), no. 1, 142-174 (hereinafter Oder). It uses a sequence of one arithmetic-to-arithmetic (A2A) and one arithmetic-to-Boolean (A2B) sharing conversion per coefficient to decode the coefficients of a masked polynomial to masked bits. The main drawbacks are that this solution is limited to first order security and introduces a high performance overhead due to the two conversions.

The most recent and most efficient approach was proposed in Michiel Van Beirendonck, Jan-Pieter D'Anvers, Angshuman Karmakar, Josep Balasch, and Ingrid Verbauwhede, *A side-channel resistant implementation of SABER*, IACR Cryptol. ePrint Arch. 2020 (2020), 733

(hereinafter Van Beirendonck). In their case, the targeted post-quantum KEM uses a power-of-two modulus which reduces the decoding to a simple shift of the coefficients. The masked implementation of this step is realized with one call to a new table-based A2A. While this results in an efficient masked decoding step, their approach is most efficient for schemes with power-of-two moduli and cannot be easily used for prime moduli.

Besides the dedicated masked decoding schemes, it is also possible to implement it using generic masking of look-up-tables. In this case, the decoding step is completely implemented in a table and protected using a table masking scheme, e.g., Jean-Sébastien Coron, *Higher order masking of look-up tables*, Advances in Cryptology—EUROCRYPT 2014—33rd Annual International Conference on the Theory and Applications of Cryptographic Techniques, Copenhagen, Denmark, May 11-15, 2014. Proceedings (Phong Q. Nguyen and Elisabeth Oswald, eds.), Lecture Notes in Computer Science, vol. 8441, Springer, 2014, pp. 441-458 (hereinafter Coron). The main drawbacks are that it requires multiple tables whose size depends on the used modulus, and can introduce a high performance overhead especially for large moduli. In addition, it has been shown that this table-based approach suffers especially at higher orders from attacks that exploit multiple points in time. (See e.g., Nicolas Bruneau, Sylvain Guilley, Zakaria Najm, and Yannick Teglia, *Multi-variate high-order attacks of shuffled tables recomputation*, Cryptographic Hardware and Embedded Systems—CHES 2015—17th International Workshop, Saint-Malo, France, Sep. 13-16, 2015, Proceedings (Tim Güneysu and Helena Handschuh, eds.), Lecture Notes in Computer Science, vol. 9293, Springer, 2015, pp. 475-494.)

The embodiments described herein improve on the state-of-the-art enabling a significantly more efficient implementation of post-quantum schemes which include the decoding of polynomials to bitstrings. This is achieved by a masked decoding approach that requires only one A2B conversion per coefficient, works for arbitrary moduli, and does not necessarily require pre-computed tables. It improves both the number of operations and of random elements as compared to prior methods, while not necessarily requiring storing large tables as the table-based approaches.

The embodiments described herein use a new way of decoding masked polynomials which works for arbitrary moduli and without pre-computed tables. In particular, it avoids the costly A2A conversion of the approach from Oder and relies on bit-slicing to significantly reduce the number of masked AND operations. At its core, it includes an A2B conversion with a subsequent masked binary search to determine the decoded bit. In contrast to the majority of the prior art which is usually limited to first order security, the embodiments disclosed herein may be described in a way that it can be instantiated at any desired security order. Overall, this helps to reduce both the total number of operations and random elements while allowing one to obtain higher-order protected implementations compared to the prior art.

Let $f \in \mathbb{Z}_q[X]$ be a polynomial of degree (at most) m−1: i.e., $f(X)=\Sigma_{j=0}^{m-1} x_j X^j$, with $x_j \in \mathbb{Z}_q$ where $x=(x_0, \ldots, x_{m-1})$ may be written. An arithmetic sharing of a polynomial x is written as x consisting of n arithmetic shares $x^{(i)}=(x_0^{(i)}, \ldots, x_{m-1}^{(i)}) \in \mathbb{Z}_q^m$, $0 \leq i < n$ such that $$f(X) = \sum_{j=0}^{m-1}\sum_{i=0}^{n-1} x_j^{(i)} X^j \equiv \sum_{j=0}^{m-1} x_j X^j \pmod{q}.$$

A Boolean sharing of some value $x \in \mathbb{F}_{2^k}$ is written as $\hat{x}$ consisting of n Boolean shares $\hat{x}_i = (\hat{x}_0^{(i)}, \ldots, \hat{x}_{k-1}^{(i)})$, $0 \leq i < n$ where $\hat{x}_j^{(i)}$ denotes the j-th bit of the i-th share of $\hat{x}$, and the following holds $$x = \bigoplus_{i=0}^{n-1} \hat{x}_i.$$

The goal is to decode a masked polynomial a to a masked bitstring $\hat{b}$ where:

a: The polynomial a is secret and should not be leaked to the attacker. Therefore, it is stored and processed in n arithmetic shares. The sharing of a is denoted as a.

$\hat{b}$: The bitstring b is secret and should not be leaked to the attacker. Therefore, it is stored and processed in n Boolean shares. The sharing of b is denoted as $\hat{b}$.

The function Decode: $\mathbb{Z}_q \mapsto \mathbb{F}_2$ is defined as follows $$\text{Decode}(x) = \begin{cases} 0, & \text{if } x \in \mathcal{J}_0 \\ 1, & \text{if } x \in \mathcal{J}_1 \end{cases},$$

where $\mathcal{J}_0$ denotes a continuous interval of values in $\mathbb{Z}_q$ which are mapped to 0 and $\mathcal{J}_1$ denotes a continuous interval of values in $\mathbb{Z}_q$ which are mapped to 1 for a given post-quantum scheme. Note that it is assumed that $\mathcal{J}_0$ and $\mathcal{J}_1$ are disjunct and cover the complete space of $\mathbb{Z}_q$ (i.e., $\mathcal{J}_0 \cap \mathcal{J}_1 = \emptyset$ and $\mathcal{J}_0 \cup \mathcal{J}_1 = \mathbb{Z}_q$). Further the function DecodePoly: $\mathbb{Z}_q[X] \mapsto \mathbb{F}_{2^m}$ is defined as DecodePoly(x)=Concat(Decode($x_i$))$_{0 \leq i < m}$, where Concat denotes the concatenation of the bits in the vector, and thus resulting in an element of $\mathbb{F}_{2^m}$. Furthermore, the embodiments described herein uses the following functions and parameters:

n: The number of shares used in the sharing of the secret polynomial. Increasing this value will improve the side-channel security, but also lower the performance of the decoding.

m: This indicates the degree of the polynomials which should be decoded. Usually, this is fixed by the use case.

k: The bitsize of the modulus q, i.e., k=$\lceil \log_2(q) \rceil$.

δ: The offset that is subtracted from each coefficient of the polynomial to enable the binary-search approach. It is set such that the interval [0, q) is split in exactly two continuous intervals which decode to either 0 or 1, separated by t, i.e., to the lowest value of the interval $\mathcal{J}$.

t: The decoding threshold indicating the decoding boundary for the coefficients after subtracting δ, i.e., any value x≥t is decoded to 1, while the rest is decoded to 0. It is set to the lowest value of the shifted interval $\mathcal{J}_1$, i.e., (min($\mathcal{J}_1$)−δ) mod q.

A2B: The function converts n arithmetic shares $a_i \in \mathbb{Z}_q^n$ to n Boolean shares $\hat{a}_i \in \mathbb{F}_{2^{is\,k}}^n$, which encode the same secret value $a_i$. The embodiments described herein are independent of the actual implementation of this function and may utilize any of the existing solutions (e.g., Jean-Sébastien Coron, Johann Großschädl, and Praveen Kumar Vadnala, *Secure conversion between boolean and arithmetic masking of any order*, Cryptographic Hardware and Embedded Systems—CHES 2014—16th International Workshop, Busan, South Korea, Sep. 23-26, 2014. Proceedings (Lejla Batina and Matthew Robshaw, eds.), Lecture Notes in Computer Science, vol. 8731, Springer, 2014, pp. 188-205.), as long as it provides the desired security.

Bitslice: The function transforms a Boolean sharing of a polynomial $\hat{a} \in \mathbb{F}_{2^n}^{n \times m}$ into its bitsliced representation $\hat{x} \in \mathbb{F}_{2^m}^{n \times k} = (\hat{x}_0, \ldots, \hat{x}_{k-1})$, where $\hat{x}_i \in \mathbb{F}_{2^m}^n$ denotes the concatenation of the i-th bit of all m coefficients of a shared in n Boolean shares. Note that the transformation may be done independently on each input share. Still, to avoid bit-level leakage this operation might be implemented in a hardened fashion, e.g., utilizing a dedicated hardware circuit to transform bits of multiple coefficients in parallel.

Refresh: The function Refresh: $\mathbb{F}_{2^n}^n \mapsto \mathbb{F}_{2^n}^n$ refreshes a given Boolean sharing of a variable. The embodiments described herein are independent of the actual implementation of this function and may utilize any of the existing solutions (e.g., Gilles Barthe, Sonia Belaïd, Thomas Espitau, Pierre-Alain Fouque, Benjamin Grégoire, Mélissa Rossi, and Mehdi Tibouchi, *Masking the GLP lattice-based signature scheme at any order*, Advances in Cryptology—EUROCRYPT 2018—37th Annual International Conference on the Theory and Applications of Cryptographic Techniques, Tel Aviv, Israel, Apr. 29-May 3, 2018 Proceedings, Part II (Jesper Buus Nielsen and Vincent Rijmen, eds.), Lecture Notes in Computer Science, vol. 10821, Springer, 2018, pp. 354-384.), as long as it provides the desired security.

SecAND: The function SecAND: $\mathbb{F}_{2^m}^n \times \mathbb{F}_{2^m}^n \mapsto \mathbb{F}_{2^m}^n$ computes the bit-wise AND of two given Boolean-shared inputs in a masked fashion. The embodiments described herein are independent of the actual implementation of this function and may utilize any of the existing solutions (e.g., Yuval Ishai, Amit Sahai, and David A. Wagner, *Private circuits: Securing hardware against probing attacks*, Advances in Cryptology—CRYPTO 2003, 23rd Annual International Cryptology Conference, Santa Barbara, Calif., USA, Aug. 17-21, 2003, Proceedings (Dan Boneh, ed.), Lecture Notes in Computer Science, vol. 2729, Springer, 2003, pp. 463-481.), as long as it provides the desired security.

⊕: This function computes the bit-wise XOR of two given Boolean-shared inputs. Note that XOR may be computed independently on each share.

¬: This function computes the bit-wise negation of the input bitstring.

A masked decoding method may be described using the following pseudo code:

---
Input: An arithmetic sharing a
  of a polynomial $a \in \mathbb{Z}_q[X]$.
Output: A Boolean sharing $\hat{b}$ of the bitstring
  $b \in \mathbb{F}_{2^m}$ with $b = \text{DecodePoly}(a)$.

---
1:    for i = 0 to m − 1 do
2:        $a_i^{(0)} = a_i^{(0)} - \delta \mod q$
3:        $\hat{a}_i = A2B(a_i)$
4:    $\hat{x}$ = Bitslice($\hat{a}$)
5:    $\hat{y}$ = Refresh($2^m - 1, 0, \ldots, 0$)
6:    $\hat{b}$ = (0,...,0)
7:    d = 0
8:    for i = 1 to k do
9:        $e = d + 2^{k-i}$
10:       if e ≥ t then
11:           $\hat{b} = \hat{b} \oplus \text{SecAND}(\hat{y}, \hat{x}_{k-i})$
12:           $\hat{x}_{k-i}^{(0)} = \neg \hat{x}_{k-i}^{(0)}$
13:       if e ≤ t then
14:           d = e ---
Input: An arithmetic sharing a
  of a polynomial $a \in \mathbb{Z}_q[X]$.
Output: A Boolean sharing $\hat{b}$ of the bitstring
  $b \in \mathbb{F}_{2^m}$ with $b = \text{DecodePoly}(a)$.

---
15:       if d == t then
16:           return $\hat{b}$
17:       $\hat{y}$ = SecAND($\hat{y}, \hat{x}_{k-i}$)

---

The masked decoding method performs the decoding as follows. Initially in steps 1 to 3, δ is subtracted from each coefficient (i.e., for coefficients 0 to m−1) of the polynomial a, which is then transformed to Boolean shares using an A2B function. Due to this shifting, the coefficient values 0≤x<t should be decoded to 0, while x≥t are decoded to 1. This mapping cannot be easily computed on shared values directly. Instead, a masked binary-search like approach is performed in a bitsliced fashion. Informally, the mapping can be represented by multiple logical formulas for all bits $s \subseteq \{0, \ldots, k\}$ which add up to values greater than the threshold, i.e., $(\Sigma_{i \in s} 2^i) \geq t$. The binary search in the masked decoding method constructs these formulas more efficiently. However, the simplified representation in the masked decoding method may be optimized by unrolling the loop for specific k and performing common subexpression elimination. The process is exemplified for KYBER in the pseudo code. Note that for KYBER the resulting expression is already optimal and does not need to be optimized, i.e., the masked decoding method may be implemented as is.

An example of how the masked decoding method operates will now be described. A modulus value q=3329 is used as in the KYBER KEM with the parameters k=12, δ=2497, and t=1664. In the following, an equation is derived to compute the decoding operations Decode(x) using only XOR, AND, and negation. The resulting equation for Decode is computed by the masked decoding method iteratively using masked implementations for XOR and AND.

The output $\hat{b}$ is initialized to all zeros and will be updated as the binary search is carried out.

1. $2^{11} > 1664$: If $x_{11}=1$, then x should be decoded to 1. So at step 9, if $x_{11}=1$ then $e=2^{11}=2048$, which is greater than t=1664. Otherwise, less significant bits need to be taken into consideration and in this case the value of d is updated to the value of e at step 14, therefore: Decode $(x) = x_{11} \oplus \neg x_{11} \cdot (\ldots)$ 2. $2^{10} < 1664$: In the next iteration of the loop of step 8 where k−i=10, if $x_{10}=0 \wedge x_{11}=0$, then x should be decoded to 0, which means the value of $\hat{b}$ is not changed at steps 13 and 14, but the value of d is updated. Otherwise, less significant bits need to be taken into consideration: Decode(x)= $x_{11} \oplus \neg x_{11} \cdot x_{10} \cdot (\ldots)$ 3. $2^{10}+2^9 < 1664$: In the next iteration of the loop of step 8 where k−i=9, if $x_9=0 \wedge x_{10}=1 \wedge x_{11}=0$, then x should be decoded to 0, which means the value of $\hat{b}$ is not changed at steps 13 and 14, but the value of d is updated. Otherwise, less significant bits need to be taken into consideration: Decode(x)=$x_{11} \oplus \neg x_{11} \cdot x_{10} \cdot x_9 \cdot (\ldots)$ 4. $2^{10}+2^9+2^8 > 1664$: In the next iteration of the loop of step 8 where k−i=8, if $x_8=1 \wedge x_9=1 \wedge x_{10}=1 \wedge x_{11}=0$, then x should be decoded to 1, and this is accomplished at steps 10 to 12. Otherwise, less significant bits need to be taken into consideration: Decode(x)=$x_{11} \oplus \neg x_{11} \cdot x_{10} \cdot x_9 \cdot (x_8 \oplus \neg x_8 \cdot (\ldots))$ 5. $2^{10}+2^9+2^7=1664$: In the next iteration of the loop of step 8 where k−i=7, if $x_7=1 \wedge x_9=1 \wedge x_{10}=1 \wedge x_{11}=0$, then x should be decoded to 1, and this is accomplished at steps 10 to 12. All remaining combinations should be decoded to 0 because they are necessarily<1664 and the result of $\hat{b}$ may be returned at steps 15 and 16, therefore: Decode $(x)=x_{11}\oplus \neg x_{11}\cdot x_{10}\cdot x_9\cdot(x_8 \oplus \neg x_8\cdot x_7)$ The above example illustrates the operation of the binary search of the masked decoding method. The loop starting at step 8 performs a binary search to determine all $a_j>t$ in parallel for all j, i.e., across all coefficients. This speeds up the decoding process.

As noted before, the solution in Oder is only valid at the first security order, contrary to the masked decoding method which works at arbitrary orders. Still, any higher order extension based on the original ideas of Oder would require at least one A2A and one A2B conversion per coefficient. The masked decoding method is much more efficient in this regard, as it only uses one A2B per coefficient. The binary-search of the masked decoding method is also performed in a bitsliced fashion, which should result in a superior performance given common register sizes (i.e., 32 bits) and parameter sets (e.g., KYBER).

In Van Beirendonck, while their approach is very efficient and potentially applicable for higher security orders, it is limited to power-of-two moduli and at least for their implementation requires pre-computed tables. In contrast, the masked decoder may be used for arbitrary moduli and provides competitive performances even for power-of-two moduli, as in that case the binary-search requires only one iteration.

In Coron, the generic table-based approach requires tables depending on the number of shares and the size of the moduli. Consider the case of KYBER with q=3329, which would require multiple tables with $2^{12}$ entries. In contrast, the masked decode method may be instantiated without any pre-computed tables depending on how the A2B conversion is implemented.

The masked decode method described herein provides a more efficient decoding of polynomial coefficients that may be used with any modulus and instantiated at any security order to counter side-channel attacks. As described above, the masked decode method described herein provides various benefits over existing methods of using shares for the binary decoding of the coefficients of a polynomial.

FIG. 1 illustrates an exemplary hardware diagram 100 for implementing the masked decoding method. As illustrated, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, microcontroller, graphics processing unit (GPU), field programmable gate array (FPGA), application-specific integrated circuit (ASIC), or other similar devices.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user as needed. For example, the user interface 140 may include a display, a touch interface, a mouse, and/or a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol or other communications protocols, including wireless protocols. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. The storage 162 may include instructions for implementing the masked decoding method described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A method for masked decoding of a polynomial $\alpha$ using an arithmetic sharing a to perform a cryptographic operation in a data processing system using a modulus q, the method for use in a processor of the data processing system, comprising:
    subtracting an offset $\delta$ from each coefficient of the polynomial $\alpha$;
    applying an arithmetic to Boolean (A2B) function on the arithmetic shares $a_i$ of each coefficient $a_i$ to produce Boolean shares $\hat{a}_i$ that encode the same secret value $a_i$;
    performing in parallel for all coefficients a shared binary search to determine which of coefficients $a_i$ are greater than a threshold t to produce a Boolean sharing value $\hat{b}$ of the bitstring b where each bit of b decodes a coefficient of the polynomial $\alpha$; and
    performing the cryptographic operation using the Boolean sharing value $\hat{b}$.

2. The method of claim 1, further comprising bitslicing $\hat{a}$ to produce bitsliced values $\hat{x}$ wherein the binary search is based upon the bitsliced values $\hat{x}$.

3. The method of claim 2, further comprising initiating the Boolean sharing value $\hat{b}$ to $(0, \ldots, 0)$
wherein performing in parallel for all coefficients a binary search further comprises:
    updating the Boolean sharing $\hat{b}$ by iterating through each bit value associated with the modulus q starting with the most significant bit to determine when coefficients $a_i$ are greater than a threshold t.

4. A method for masked decoding of a polynomial a using an arithmetic sharing a to perform a cryptographic operation in a data processing system using a modulus q, the method for use in a processor of the data processing system, comprising:
    calculating $a_i^{(0)} = a_i^{(0)} - \delta$ mod q for each coefficient i of the polynomial a having m coefficients;
    calculating $\hat{a}_i = A2B(a_i)$ where A2B is an arithmetic to Boolean (A2B) function on the arithmetic shares of the coefficient $a_i$ of the polynomial a to produce Boolean shares $\hat{a}_i$ that encode the same secret value $a_i$;
    calculating $\hat{x} = \text{Bitslice}(\hat{a})$ where $\hat{x}$ are bitsliced values;
    calculating $\hat{y} = \text{Refresh}(2^m - 1, 0, \ldots, 0)$ where the Refresh function refreshes a given Boolean sharing of a variable;
    calculating $\hat{b} = (0, \ldots, 0)$ to initialize the Boolean sharing $\hat{b}$ of the bitstring b;
    initializing a first tracking variable d to 0;
    perform the following steps to perform a binary search for each value of i from 1 to k where k is the number of bits in the modulo q:
        calculating $e = d + 2^{k-i}$, where e is a second tracking variable;
        when $e \geq t$ calculate the following:
            $\hat{b} = \hat{b} \oplus \text{SecAND}(\hat{y}, \hat{x}_{k-i})$ where the function SecAND computes the bit-wise AND of two given Boolean-shared inputs in a masked fashion and the function $\oplus$ computes the bit-wise XOR of two given Boolean-shared inputs; and
            $\hat{x}_{k-i}^{(0)} = \neg \hat{x}_{k-i}^{(0)}$, where the function $\neg$ computes the bit-wise negation of the input bitstring;
        when $e \leq t$ calculating $d = e$;
        when $d = t$ returning the value $\hat{b}$ and ending the binary search; and
        calculating $\hat{y} = \text{SecAND}(\hat{y}, \hat{x}_{k-i})$, where the function SecAND computes the bit-wise AND of two given Boolean-shared inputs in a masked fashion; and
    performing the cryptographic operation using the Boolean sharing value b.

5. A data processing system comprising instructions embodied in a non-transitory computer readable medium, the instructions for masked decoding of a polynomial a using an arithmetic sharing a to perform a cryptographic operation in a processor, the instructions, comprising:
    instructions for subtracting an offset $\delta$ from each coefficient of the polynomial a;
    instructions for applying an arithmetic to Boolean (A2B) function on the arithmetic shares of the coefficient $a_i$ of the polynomial a to produce Boolean shares $\hat{a}_i$ that encode the same secret value $a_i$;
    instructions for performing in parallel for all coefficients a shared binary search to determine which of the coefficients $a_i$ are greater than a threshold t to produce a Boolean sharing value $\hat{b}$ of the bitstring b where each bit of b decodes a coefficient of the polynomial a; and
    performing the cryptographic operation using the Boolean sharing value $\hat{b}$.

6. The data processing system of claim 5, further comprising instructions for bitslicing $\hat{a}$ to produce bitsliced values $\hat{x}$ wherein the binary search is based upon the bitsliced values $\hat{x}$.

7. The data processing system of claim 6, further comprising instructions for initiating the Boolean sharing value $\hat{b}$ to $(0, \ldots, 0)$ wherein performing in parallel for all shares a binary search further comprises:
    instructions for updating the Boolean sharing $\hat{b}$ by iterating through each bit value associated with the modulus q starting with the most significant bit to determine when coefficients $a_i$ are greater than a threshold t.

8. A data processing system comprising instructions embodied in a non-transitory computer readable medium, the instructions for masked decoding of a polynomial a using an arithmetic sharing a to perform a cryptographic operation in a processor, the instructions, comprising:
- instructions for calculating $a_i^{(0)}=a_i^{(0)}-\delta \mod q$ for each coefficient i of the polynomial a having m coefficients;
- instructions for calculating $\hat{a}_i=A2B(a_i)$ where A2B is an arithmetic to Boolean (A2B) function on the arithmetic shares of the coefficient $a_i$ of the polynomial a to produce Boolean shares $\hat{a}_i$ that encode the same secret value $a_i$;
- instructions for calculating $\hat{x}=$Bitslice$(\hat{a})$ where $\hat{x}$ are bitsliced values;
- instructions for calculating $\hat{y}=$Refresh$(2^m-1, 0, \ldots, 0)$ where the Refresh function refreshes a given Boolean sharing of a variable;
- instructions for calculating $\hat{b}=(0, \ldots, 0)$ to initialize the Boolean sharing $\hat{b}$ of the bitstring b;
- instructions for initializing a first tracking variable d to 0;
- instructions for performing the following steps to perform a binary search for each value of i from 1 to k where k is the number of bits in the modulo q:
  - instructions for calculating $e=d+2^{k-i}$, where e is a second tracking variable;
  - instructions for when e≥t calculating the following:
    - $\hat{b}=\hat{b}\oplus$SecAND$(\hat{y},\hat{x}_{k-i})$ where the function SecAND computes the bit-wise AND of two given Boolean-shared inputs in a masked fashion and the function $\oplus$ computes the bit-wise XOR of two given Boolean-shared inputs; and
    - $\hat{x}_{k-i}^{(0)}=\neg\hat{x}_{k-i}^{(0)}$, where the function $\neg$ computes the bit-wise negation of the input bitstring;
  - instructions for when e≤t calculating d=e;
  - instructions for when d=t returning the value $\hat{b}$ and ending the binary search; and
  - instructions for calculating $\hat{y}=$SecAND$(\hat{y},\hat{x}_{k-i})$, where the function SecAND computes the bit-wise AND of two given Boolean-shared inputs in a masked fashion; and
- instructions for performing the cryptographic operation using the Boolean sharing value b.

* * * * *